United States Patent
Munakata et al.

(10) Patent No.: US 7,510,281 B1
(45) Date of Patent: Mar. 31, 2009

(54) METHOD FOR MANUFACTURING BIFOCAL LENS

(75) Inventors: Yoshikazu Munakata, Osaka (JP); Kaoru Miyoshi, Sabae (JP)

(73) Assignees: Sun-Ray Corporation, Osaka (JP); Sankoh Co., Ltd., Sabae-Shi (JP)

( * ) Notice: Subject to any disclaimer, the term of this patent is extended or adjusted under 35 U.S.C. 154(b) by 3 days.

(21) Appl. No.: 11/865,674

(22) Filed: Oct. 1, 2007

(51) Int. Cl.
*G02C 7/06* (2006.01)

(52) U.S. Cl. ........................ 351/177; 351/161; 351/164; 351/168; 264/1.32

(58) Field of Classification Search ................. 351/161, 351/164, 168–172, 177; 264/1.1–2.7
See application file for complete search history.

(56) References Cited

U.S. PATENT DOCUMENTS

2006/0146234 A1* 7/2006 Bear et al. ..................... 349/96
2007/0001327 A1* 1/2007 Chiu ........................... 264/1.7

* cited by examiner

*Primary Examiner*—Darryl J Collins
(74) *Attorney, Agent, or Firm*—Judge Patent Associates

(57) ABSTRACT

This invention is to provide an inexpensive lens can be worn without attention to the existence of the addition power segment of conventional polarizing lens, it and a bench lens are formed integrally on the rear surface of a polarizing member 6. The present inventors constituent a polarizing member 9 by sandwiching poly vinyl alcohol 3 as a polarizing film with poly carbonate 2 whose both surfaces are stretched, and mold resin 2' on the rear side of the polarizing member, and arrange an addition power segment 8 integrally on the rear surface, make the molded resin poly carbonate sandwiches the polarizing film. The top and the bottom of this member are cut as FIGs. to form lens at low costs, and the adhesion among respective resins is increased, and to secure the impact resistance and it is possible to create a lens without detachment because of same resin.

10 Claims, 8 Drawing Sheets

Measuring with 50mm sag gauge in axial & anti-axial

| | | gate direction | anti-gate direction | difference | | |
|---|---|---|---|---|---|---|
| 55mm | No1 | 4.910 | 4.870 | 0.040 | | |
| | No2 | 4.900 | 4.845 | 0.055 | | |
| | No3 | 4.920 | 4.870 | 0.050 | | |
| | No4 | 4.895 | 4.860 | 0.035 | | |
| | No5 | 4.900 | 4.850 | 0.050 | | |
| | No6 | 4.895 | 4.860 | 0.035 | | |
| | No7 | 4.895 | 4.860 | 0.035 | | |
| | No8 | 4.910 | 4.870 | 0.040 | Aver | 0.042 |
| | | | | | Stdev | 0.008 |
| 60mm | No1 | 4.870 | 4.785 | 0.085 | | |
| | No2 | 4.855 | 4.740 | 0.115 | | |
| | No3 | 4.840 | 4.760 | 0.080 | | |
| | No4 | 4.865 | 4.780 | 0.085 | | |
| | No5 | 4.900 | 4.750 | 0.150 | | |
| | No6 | 4.870 | 4.795 | 0.075 | | |
| | No7 | 4.880 | 4.740 | 0.140 | | |
| | No8 | 4.860 | 4.760 | 0.100 | Aver | 0.104 |
| | | | | | Stdev | 0.029 |
| Whole (76mm) (prior) | No1 | 4.890 | 4.700 | 0.190 | | |
| | No2 | 4.810 | 4.630 | 0.180 | | |
| | No3 | 4.880 | 4.645 | 0.235 | | |
| | No4 | 4.890 | 4.725 | 0.165 | | |
| | No5 | 4.830 | 4.700 | 0.130 | | |
| | No6 | 4.890 | 4.645 | 0.245 | | |
| | No7 | 4.840 | 4.630 | 0.210 | | |
| | No8 | 4.895 | 4.740 | 0.155 | Aver | 0.189 |
| | | | | | Stdev | 0.040 |

| | | Aver | Stdev |
|---|---|---|---|
| Results | 55mm | 0.042 | 0.008 |
| | 60mm | 0.104 | 0.029 |
| | Whole(76mm) | 0.189 | 0.040 |

FIG.3

Measuring with 50mm sag gauge in axial & anti-axial
and arrange deta of Fig.3 to radius of curvature & lens curve

| Width of sheet | sample No | Anti-axial Sag | Anti-axial radius of curvature & lens curve(mm) | Anti-axial curve | axial Sag | axial radius of curvature & lens curve(mm) | axial curve | curve difference |
|---|---|---|---|---|---|---|---|---|
| 55mm | No1 | 4.910 | 66.101 | 8.018 | 4.870 | 66.603 | 7.958 | 0.061 |
| | No2 | 4.900 | 66.226 | 8.003 | 4.845 | 66.922 | 7.920 | 0.083 |
| | No3 | 4.920 | 65.976 | 8.033 | 4.870 | 66.603 | 7.958 | 0.076 |
| | No4 | 4.895 | 66.288 | 7.995 | 4.860 | 66.730 | 7.942 | 0.053 |
| | No5 | 4.900 | 66.226 | 8.003 | 4.850 | 66.858 | 7.927 | 0.076 |
| | No6 | 4.895 | 66.288 | 7.995 | 4.860 | 66.730 | 7.942 | 0.053 |
| | No7 | 4.895 | 66.288 | 7.995 | 4.860 | 66.730 | 7.942 | 0.053 |
| | No8 | 4.910 | 66.101 | 8.018 | 4.870 | 66.603 | 7.958 | 0.061 |
| 60mm | No1 | 4.870 | 66.603 | 7.958 | 4.785 | 67.701 | 7.829 | 0.129 |
| | No2 | 4.855 | 66.794 | 7.935 | 4.740 | 68.298 | 7.760 | 0.175 |
| | No3 | 4.840 | 66.986 | 7.912 | 4.760 | 68.031 | 7.791 | 0.122 |
| | No4 | 4.865 | 66.667 | 7.950 | 4.780 | 67.767 | 7.821 | 0.129 |
| | No5 | 4.900 | 66.226 | 8.003 | 4.750 | 68.164 | 7.775 | 0.228 |
| | No6 | 4.870 | 66.603 | 7.958 | 4.795 | 67.570 | 7.844 | 0.114 |
| | No7 | 4.880 | 66.477 | 7.973 | 4.740 | 68.298 | 7.760 | 0.213 |
| | No8 | 4.860 | 66.730 | 7.942 | 4.760 | 68.031 | 7.791 | 0.152 |
| Whole (76mm) | No1 | 4.890 | 66.351 | 7.988 | 4.700 | 68.839 | 7.699 | 0.289 |
| | No2 | 4.810 | 67.374 | 7.867 | 4.630 | 69.810 | 7.592 | 0.274 |
| | No3 | 4.880 | 66.477 | 7.973 | 4.645 | 69.599 | 7.615 | 0.358 |
| | No4 | 4.890 | 66.351 | 7.988 | 4.725 | 68.500 | 7.737 | 0.251 |
| | No5 | 4.830 | 67.115 | 7.897 | 4.700 | 68.839 | 7.699 | 0.198 |
| | No6 | 4.890 | 66.351 | 7.988 | 4.645 | 69.599 | 7.615 | 0.373 |
| | No7 | 4.840 | 66.986 | 7.912 | 4.630 | 69.810 | 7.592 | 0.320 |
| | No8 | 4.895 | 66.288 | 7.995 | 4.740 | 68.298 | 7.760 | 0.235 |

FIG.5

Average of curve

| | axial direction | anti-axial direction | curve difference |
|---|---|---|---|
| 55mm | 8.008 | 7.943 | 0.064 |
| 60mm | 7.954 | 7.796 | 0.158 |
| whole(76mm) | 7.951 | 7.664 | 0.287 |

Deflection of curve

| | axial direction | anti-axial direction |
|---|---|---|
| 55mm | 0.014 | 0.014 |
| 60mm | 0.027 | 0.032 |
| whole(76mm) | 0.051 | 0.068 |

FIG.7

METHOD FOR MANUFACTURING BIFOCAL LENS

BACKGROUND OF THE INVENTION

1. Technical Field

This invention relates to polarized lens of multifocal.

2. Description of the Related Art

Polarizing lenses have their effect to prevent reflected light from going into the eye, and in particular they prevent reflected light from water surface, snow surface, and road surface, and their need is increasing in sports and other daily living. Further, since the demand for these polarizing lenses is expanding in senior generation, the demand for multifocal polarizing lenses is increasing. With regard to the multifocal plastic lens, there has not so far been a low-cost lens that has both durability and impact resistance.

Further, an addition power segment for multifocus has been manufactured of resin different from that of a bench lens, or has been arranged on the surface of a lens in many cases. When the addition power segment is arranged on the front surface side, it shows up, and the polarizing member must be arranged along the shape of the addition power segment, and air gets in between film and mold during molding and the degree of the addition power segment becomes uneven, and other failure occur in its manufacture, which has been a problem in the prior art.

Furthermore, conventionally the addition power segment has been manufactured separately from the bench lens and attached to the bench lens in many cases, however, the addition power segment is as extremely thin as around 0.2 mm, and it may cut the hand of a worker in attachment work, which has been another problem in the prior art.

With regard to the point that the existence of the addition power segment is seen from the outside in the state where eyeglasses to which multifocal lenses having this addition power segment in its inside is worn, by making the transmittance of the polarizing film at a specified range, the existence of the addition power segment becomes not perceptible from the outside, which has been found by experiments by the present inventors.

Moreover, in the multitiered constituent of the polarizing member, resin expanding to both the polarizing film and sandwich resin, however, studies have not been made on the adhesion compatibility between the stretched resin and the polarizing film, further the combination and expansion of resin of constituent member as the bench lens heretofore. And, the constituent resin of this polarizing member, or the bench lens molded resin and the molded resin of the addition power segment are generally formed as separate resin, in order to have different refraction index, and accordingly, detachment and durability problem, expensive lens cost may be caused, which has been still another problem in the prior art.

Further, the polarizing film itself is extremely expensive. Accordingly, it is most preferable to realize the original polarizing effect with a small use amount of this polarizing film. Further, this polarizing member is made of poly vinyl alcohol and the like, and the resin is stretched so as to have polarizing function, and poly carbonate to sandwich both the surfaces thereof are also stretched in order to reduce deformation. When the bench lens is formed further on this polarizing member, the polarizing film is heated over Tg point (glass transition point) by molten injection resin. Since the thickness of molded lens is thin, by stress of the polarizing member expansion ties to return, curve of axial direction/counter axial direction of lens after molding becomes different, which has been found, and by efforts by the present inventors, it has been found that this deformation can be reduced by partially cutting the polarizing film.

BRIEF SUMMARY OF THE INVENTION

As described above, the object of the present invention is to provide a an inexpensive lens that can be worn without attention to the existence of the addition power segment of conventional polarizing lens, in particular multifocal polarizing lens even in senior generation where demand is increasing these years, and have both durability and impact resistance.

A bifocal lens according to the present invention, as shown in FIG. 1, relates to a lens where an addition power segment and a bench lens are formed integrally on the rear surface of a polarizing member 6.

The present inventors constituent a polarizing member 9 by sandwiching poly vinyl alcohol 3 as a polarizing film with poly carbonate 2 whose both surfaces are stretched, and mold resin 2' on the rear side of the polarizing member, and arrange an addition power segment 8 integrally on the rear surface, further, make the molded resin poly carbonate as the same resin as the resin 2 that sandwiches the polarizing film. Further, the top and the bottom of this polarizing member are cut as FIGS. 2B and 2C in order to use this polarizing member to only portions necessary, and the resin to constituent both the surfaces and bench lens molded resin and addition power segment molded resin are made same, and thereby it is possible to form the addition power segment/the bench lens at low costs, and as a result, the adhesion property among respective resins is increased remarkably, and to secure the impact resistance at a first stage in both the surfaces of the polarizing film, and to secure the impact property at a second stage in bench lens and addition power segment, it is possible to improve the impact property remarkably, and further it is possible to create a lens without detachment because of same resin, and other many effects are recognized.

By adopting poly carbonate to this resin, it contributed to cost reduction too as a result. Meanwhile, in the embodiment, poly carbonate is used, however, the present invention is not limited to this, but polyamide system resin, for example 12 modified transparent resin and the like may be adopted.

Other object of the present invention is that the addition power segment is not seen when sunglasses are put on. In general, use of multifocal lenses of two focal points or more tells others that the user thereof is aged, therefore, there is a tendency that users dislike to be noticed by others. At this moment, in sunglasses, the condition of the addition power segment can be hidden well. With regard to transmittance of lens at which the existence of the addition power segment cannot be seen from the front surface side, the present inventors have made experiments and have obtained the transmittance range at which eyesight and the addition power segment are not conspicuous as shown in Table 1.

And further, as shown in FIG. 2, the present inventors have found that by cutting longitudinally or laterally a round sheet in the range that does not cause a problem in use, after molding, lens deformation of a lens is reduced. Furthermore, deformation prevention degree by cutting has been made clear. The point is incorporated into the constituent in the present invention, and it is possible to manufacture a more excellent bifocal lens.

BRIEF DESCRIPTION OF THE SEVERAL VIEWS OF THE DRAWINGS

FIG. 3 shows a comparative measured data of axial direction and anti-axial direction curve with the cut lens of the polarization member (2 type) and non-cut lens in the first embodiment.

FIG. 5 is a figure showing the result that changed data of FIG. 3 to a radius of curvature and a lens curve.

FIG. 7 shows a graph of curve average and curve difference average in FIG. 5.

DETAILED DESCRIPTION OF THE INVENTION

Figure 1:
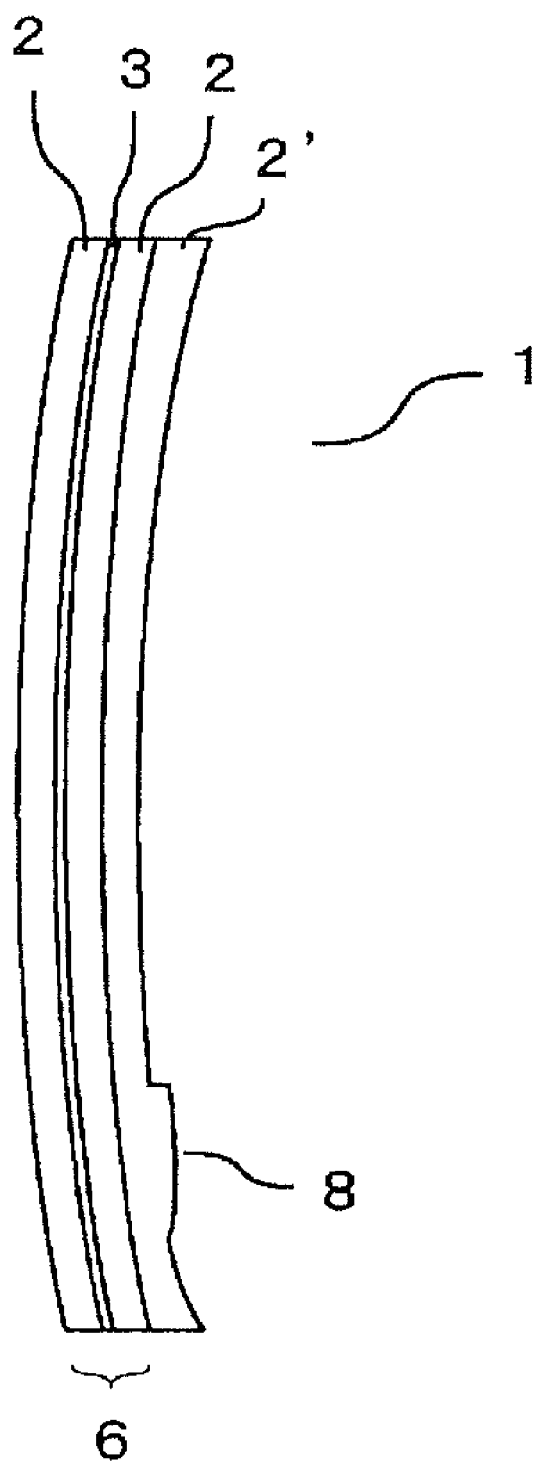
FIG. 1 shows a vertical section view of first embodiment of this invention.
Figure 2:
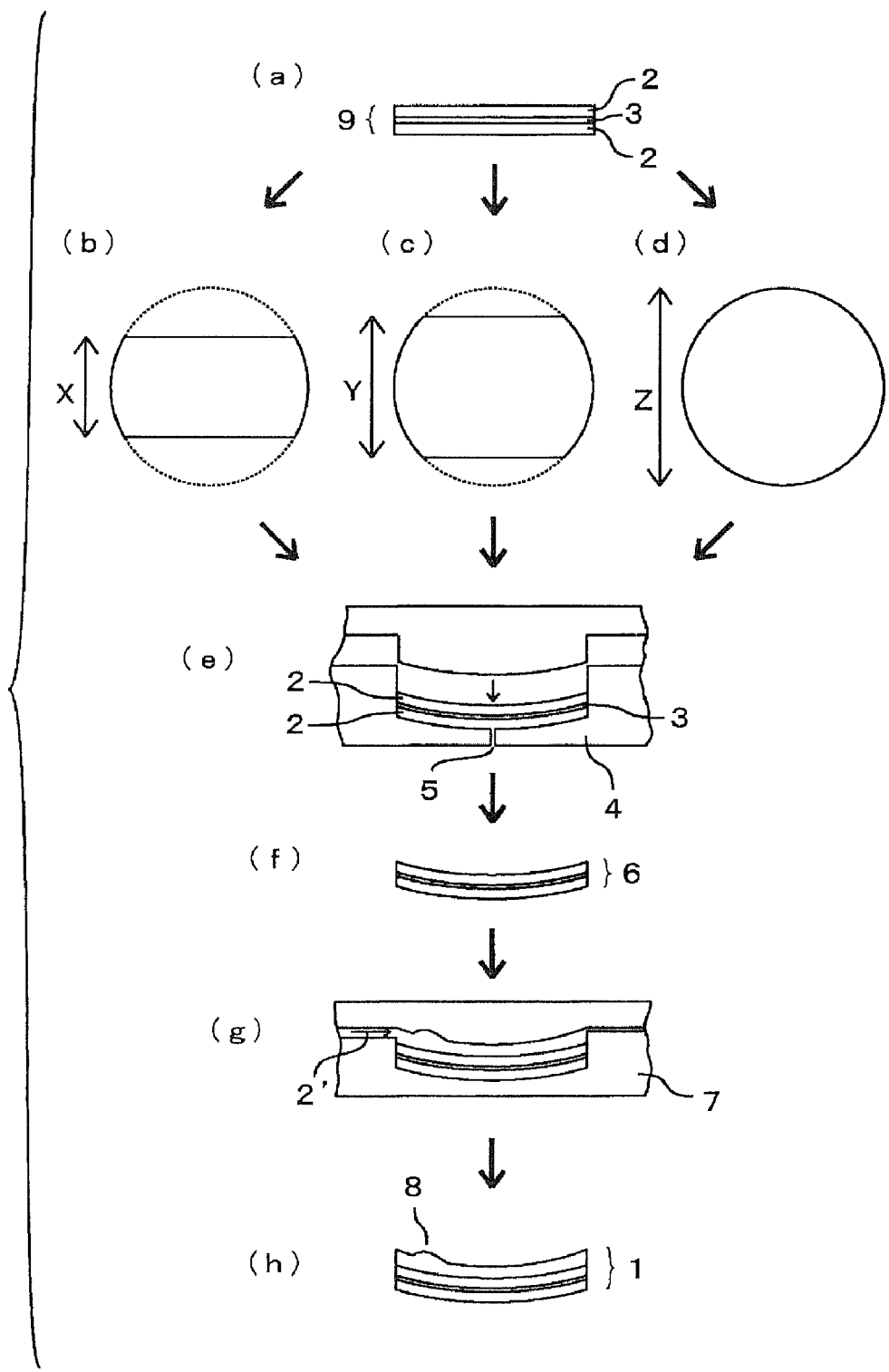
FIG. 2 shows a process of manufacturing of first embodiment of this invention.
Figure 4:
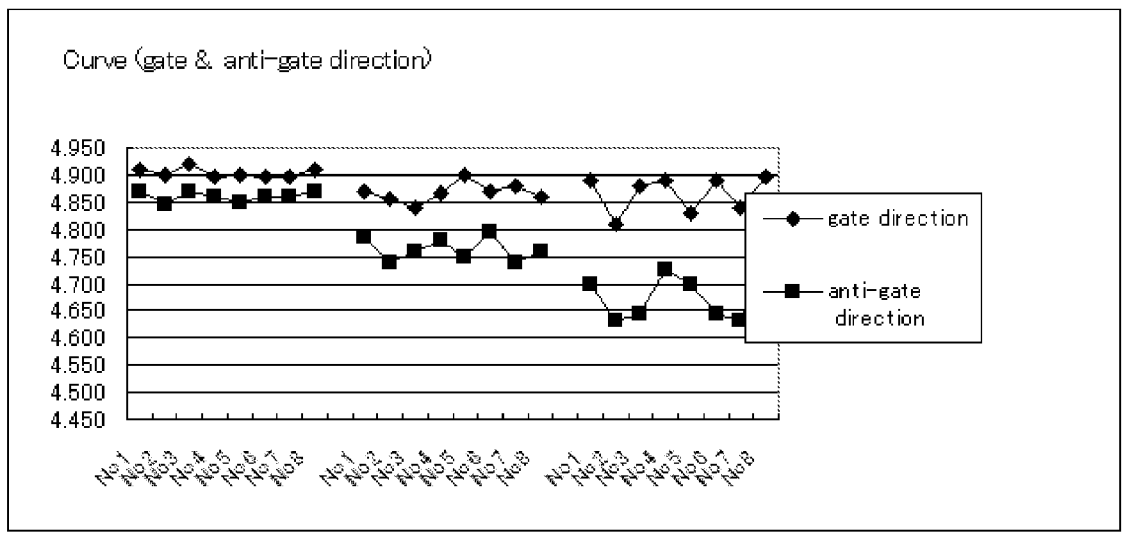
FIG. 4 shows FIG. 3 as a graph.
Figure 4:
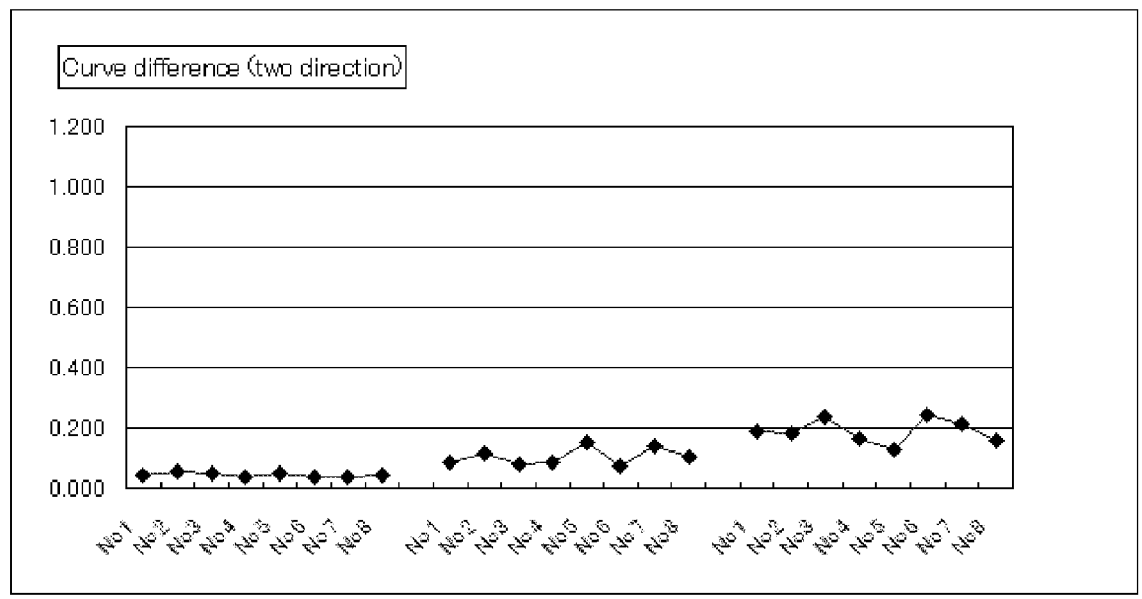
Figure 6:
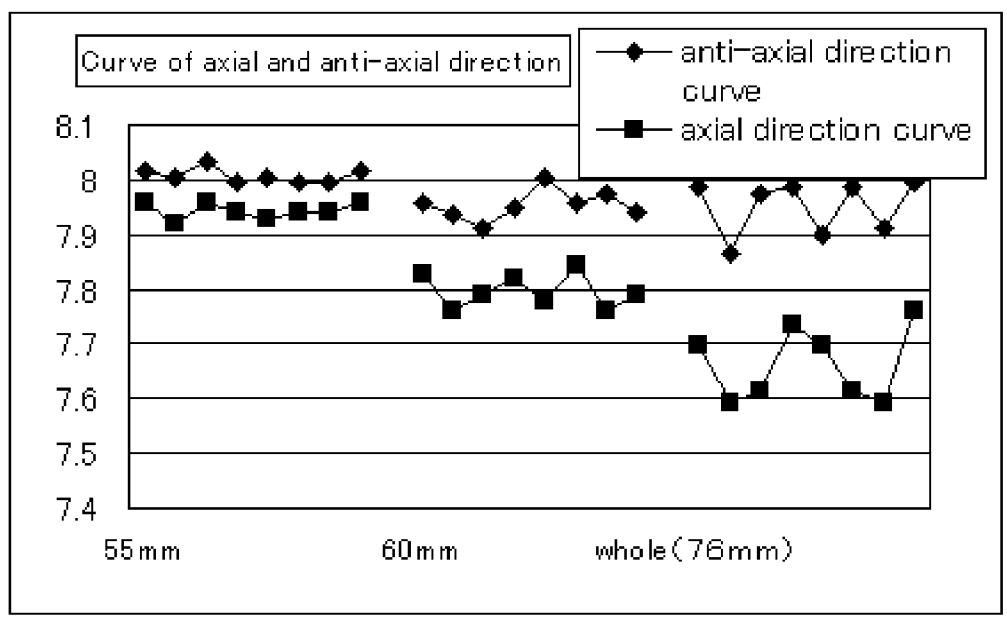
FIG. 6 shows a graph of curve and curve difference in FIG. 5.
Figure 6:
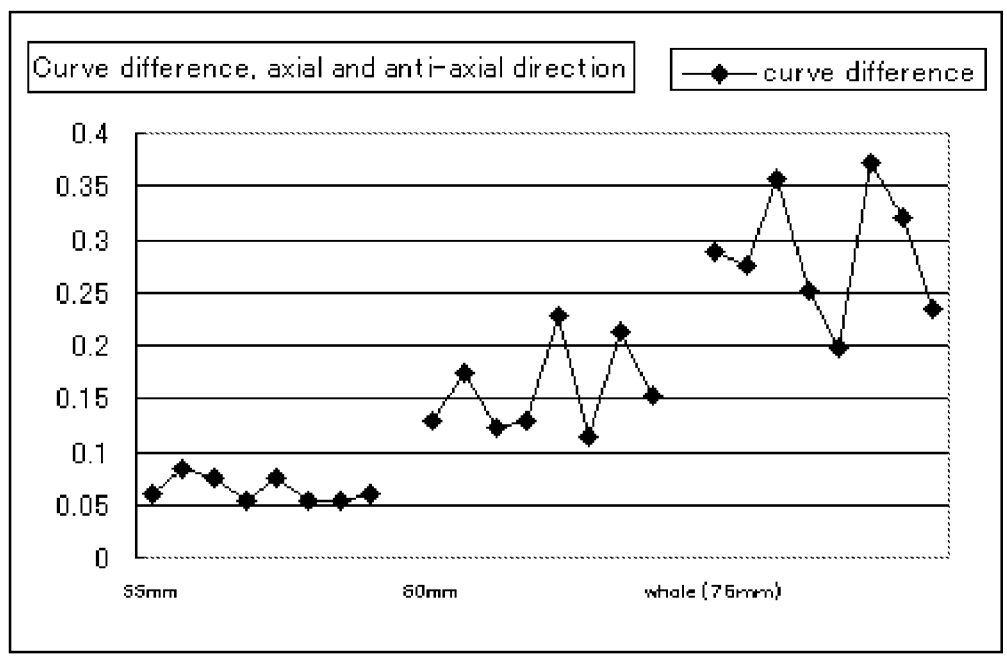
Figure 8:
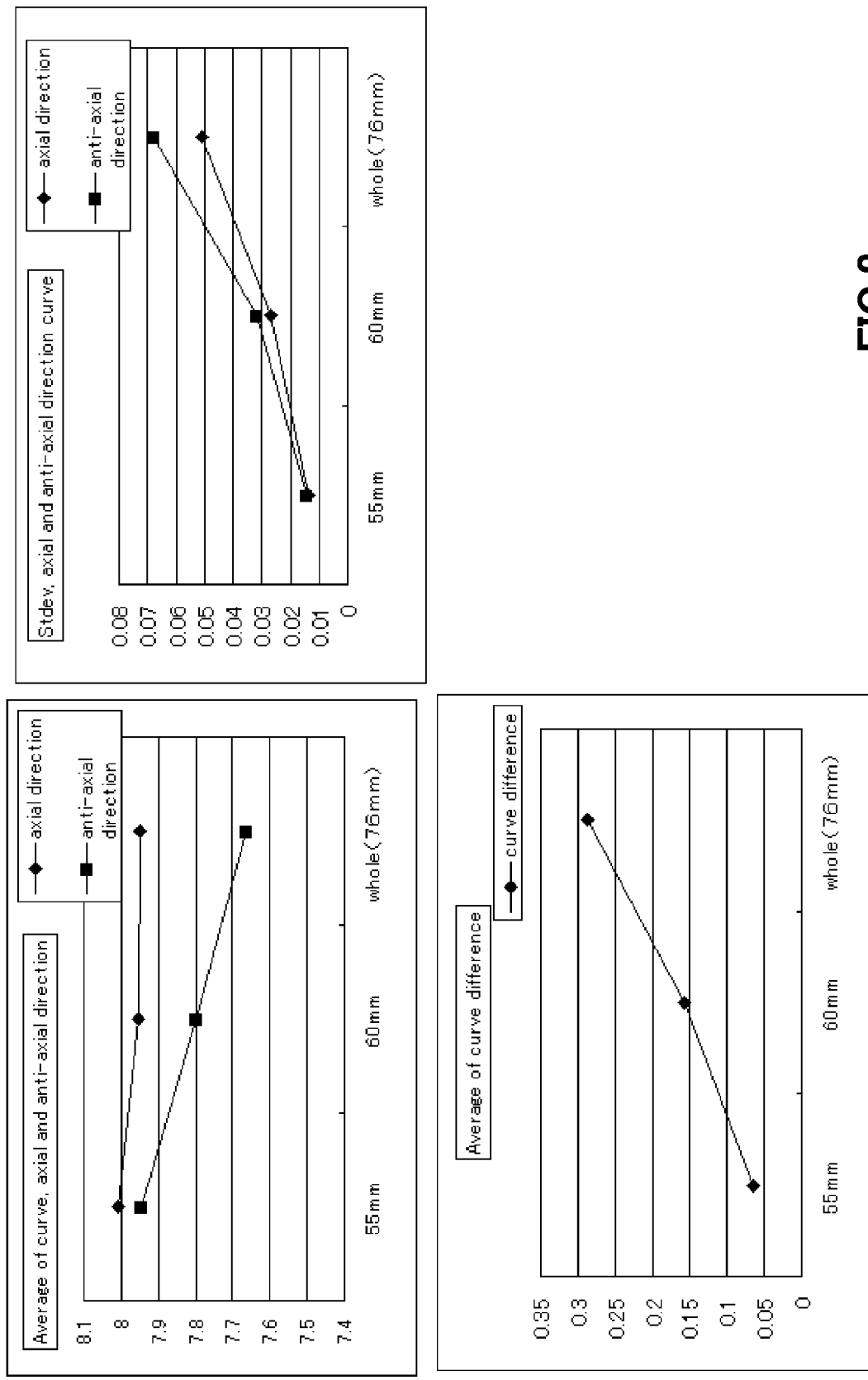
FIG. 8 shows FIG. 7 as a graph.

Best mode example is explained with FIG. 2.

First, polarization member 9 with 0.6 mm is prepared, which member 9 is comprised by sandwiching poly vinyl alcohol 3 as a polarizing film with poly carbonate 2 whose both surfaces are stretched Two kinds of these sheets which are cut at upside and downside, and one kind of it which is not cut are prepared.

1) The sheet which I cut to top and bottom 55 mm in width (each top and bottom width is 10.5 mm)
2) The sheet which I cut to top and bottom 62 mm in width (each top and bottom width is 7 mm)
3) The no cut sheet with 76 mm in width And I perform a process to bend a lens concavely beforehand so that I do not transform it for flow resistance of the molten polycarbonate resin at the time of resin molding to open in the back side either, and a lens of little frequency of the stable distortion is provided. Therefore I set a polarization member in concave bending plate 4, but establish aperture 5 for absorption in the center bottom of this concave bending plate 4. I put pressure from the seat upper part and transformed a seat after having picked up the seat which I preheated on 100 degrees Celsius beforehand in and I heated concave bending plate 4 of 8R over there to temperature 120 degrees Celsius above bending plate 4, and I was in condition to have let concavity bending plate 4 adhere by absorption at the same time, and heating maintained it for three minutes and got the seat bent it to 8R. I put a seat to die 7, and injection molded two polycarbonate resin 'of molecular weight 18000 at resin temperature 270 degrees Celsius, die temperature 70 degrees Celsius, and a polarization member was at one, and it was glued together after cooling for 120 seconds by a face and was able to get by four Carlen 1 having addition power segment in the backside.

I prepared thing which changed it of the transmissivity of the polarization member of this lens to four kinds of follows, A (20%) B (25%) C (30%) D (35%) and tested whether I really saw addition power segment of the backside from the surface at the time of glasses wearing. The result shows as follows.

TABLE 1

| A (8%) | B (10%) | C (30%) | D (35%) |
|---|---|---|---|
| Addition power segment can be seen, but view is bad, and do not see a thing very well. | Addition power segment can be seen, and view is good, and can see well in a bright area. | Addition power segment almost can be seen and view is good. | Addition power segment can confirm a little and the borrowed light is slightly dazzling |

From an above experiment result, the transmissivity can apply under 35% more than 8%. More preferably, less than 30% become most suitable more than 10%. Because I am in condition to wear glasses, and other people do not understand existence of addition power segment if it is the transmissivity of under around 35%, I do not let another person feel age and am desirable. In addition, I am more than 8% and can confirm circumference in hot weather bottoms bright place, and view without the hindrance is provided for use by the daytime if I exceed 10%.

Therefore, I think about the polarizing lens of this application having addition power segment in the backside by preventing the dazzling borrowed light the outdoors, and preferably transmissivity of 10%-30% will be desirable for the transmissivity 8%-35%. When I read a small letter, the person that there was a farsightedness tendency to take off glasses slightly, and an addition power segment namely two focus lenses were developed whether you cannot read a small letter without taking off these glasses somehow, but the glasses which did not understand existence of addition power segment were expected by the outside to understand a thing in the farsightedness tendency when I was in condition to have hung glasses, and other people understood existence of addition power segment after all, but this invention solved it in old days by choosing transmissivity about the point.

Next, I measured an axial direction, an anti-axial direction in an SAG gauge of 50 mm (FIGS. 3. 4) and I changed it in a radius of curvature and a lens curve and confirmed the curve difference and unevenness (FIGS. 5 to 8).

As a result, in 76 mm that it did not cut at all, a curve difference of an average of 0.3 was recognized in an axial direction and an anti-axial direction, but it became clear that there were very few distortions of a lens with width of 55 mm to 62 mm, as 0.2 curve differences by 62 m width (top and bottom 7 mm cut) 0.05 curve difference by 55 mm width (top and bottom 10.5 mm cut). If it is 62 mm width, a difference of width of around 5 mm is thought to be can reduce a distortion from 55 mm from the above-mentioned experiment result by not giving a wide margin to a curve difference.

A cut experiments on top and bottom by an alignment cut, but an oval or six wide transformation square shape of central part is possible.

It is preferable to get cheap and superior in crash-worthiness with this bi focal lens, and can produce it, and lens transformation becomes distinguished for lens performance in few things from the point that, besides, established addition power segment in the lens inside and the point where equivalence resin has the resin that a sandwich does both sides of a polarized light membrane and the frequency and addition power segment formation resin. Furthermore, I do not have to change glasses and can enjoy sports or leisure when wearing is possible at all without minding existence of addition power segment and reads work and a letter of the small fingers because addition power segment does not understand it from the outside.

In addition, it is natural to be included in this invention if it changes it substantially, and it does not expand contents of invention as well as an above embodiment.

What is claimed is:

1. A method for manufacturing a bifocal lens wherein a polarizing member made by adhering poly carbonate to both the surfaces of a poly vinyl alcohol polarizing film is curved into a lens for eyewear, and further on the rear surface, a bench lens and an addition power segment are molded integrally by injection of poly carbonate resin.

2. The method for manufacturing a bifocal lens according to claim 1, wherein the transmittance of the polarizing film is 8% to 35%.

3. The method for manufacturing a bifocal lens according to claim 1, wherein the transmittance of the polarizing film is 10% to 30%.

4. The method for manufacturing a bifocal lens according to any one of claims 1 through 3, wherein the vertical width of the polarizing member is 55 mm to 62 mm.

5. A bifocal lens manufactured by the method for claim 1.

6. The bifocal lens according to claim 5, wherein the transmittance of the polarizing film is 8% to 35%.

7. The bifocal lens according to claim 5, wherein the transmittance of the polarizing film is 10% to 30%.

8. The bifocal lens according to claim 5, wherein the vertical width of the polarizing member is 55 mm to 62 mm.

9. The bifocal lens according to claim 6, wherein the vertical width of the polarizing member is 55 mm to 62 mm.

10. The bifocal lens according to claim 7, wherein the vertical width of the polarizing member is 55 mm to 62 mm.

* * * * *